Aug. 15, 1950   L. A. BELL   2,518,592
GLARE SCREEN MOUNTING FOR MOTOR VEHICLES
Filed Aug. 22, 1947
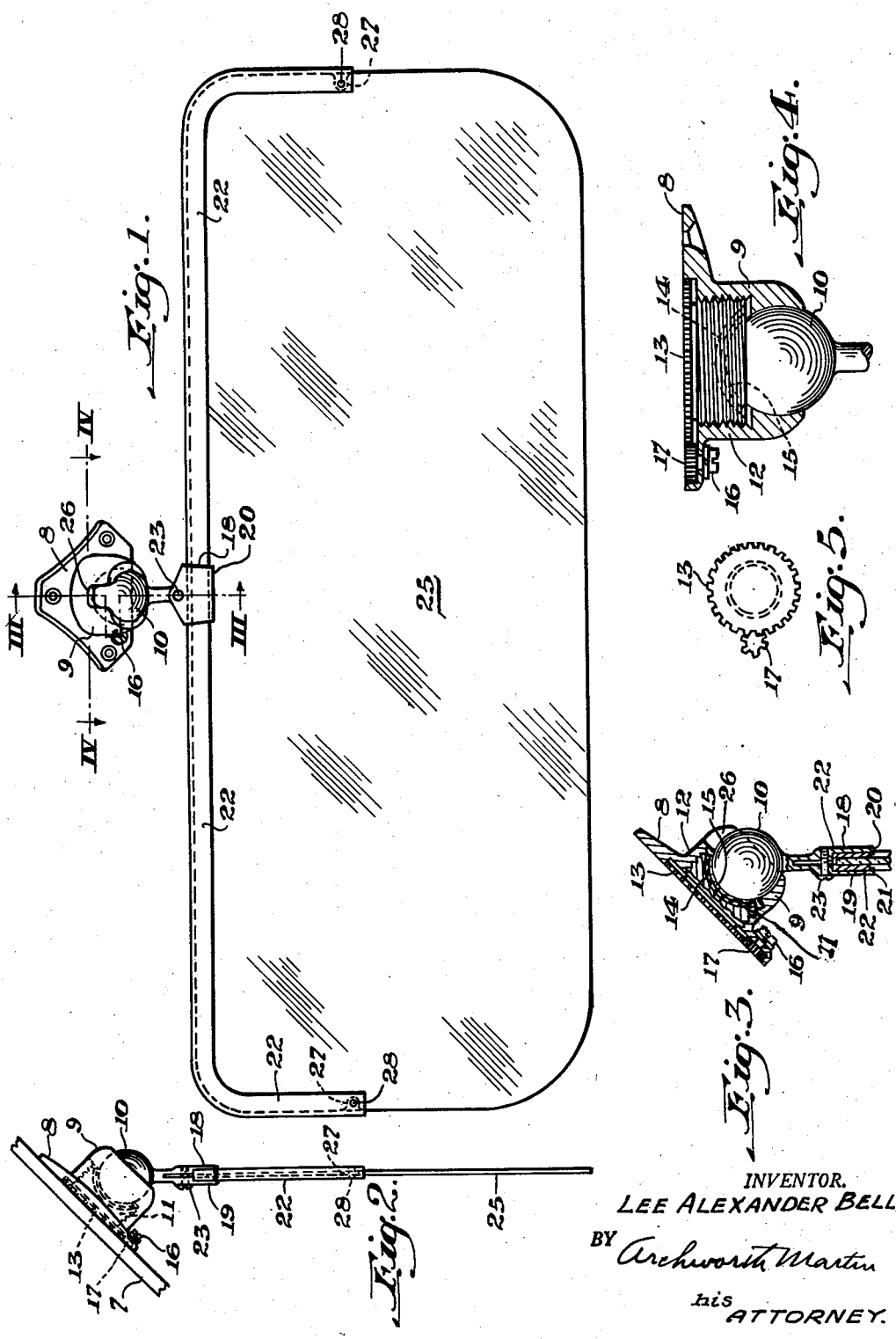
INVENTOR.
LEE ALEXANDER BELL.
BY Archworth Martin
his ATTORNEY.

Patented Aug. 15, 1950

2,518,592

UNITED STATES PATENT OFFICE 2,518,592

GLARE SCREEN MOUNTING FOR MOTOR VEHICLES

Lee Alexander Bell, Valencia, Pa.

Application August 22, 1947, Serial No. 770,141

2 Claims. (Cl. 248—274)

My invention relates to glare screens that are placed in the line of vision between the user and a bright light, for the purpose of eliminating or reducing glare, and is here shown as employed in connection with an automobile windshield for the purpose of relieving the driver's eyes from the glare of on-coming head lights or bright sunlight.

The invention has for one of its objects the provision of a glare screen wherein the frame member therefor is of such form as to present a minimum of obstruction to the driver's vision in a generally sidewise and forward direction, the semi-transparent screen being nevertheless adequately supported.

Another object of my invention is to provide a simplified and improved form of universal mounting for the screen.

In the accompanying drawing, Figure 1 is a face view of the screen and its supporting members; Fig. 2 is an end view thereof; Fig. 3 is a view taken on the line III—III of Fig. 1; Fig. 4 is an enlarged view taken approximately on the line IV—IV of Fig. 1, and Fig. 5 is a plan view of the adjusting gears of the other figures.

The screen is shown as mounted upon a wood strip 7 such as are mounted in an inclined position above the windshield, in various standard types of automobiles. A base plate 8 is connected to the strip 7 by screws and has a socket-like extension 9 to receive a ball member 10, the members 9 and 10 constituting part of a ball-and-socket joint.

A socket member 11 has a screw thread formed thereon for threaded engagement with the tubular-like extension 12 of the base 8. A toothed member 13, in the form of a gear wheel, is formed integrally with the member 11, so that when the gear wheel is turned, the plug-like socket member 11 will be screwed further into or out of the extension 12 of the base. A liner 14 of rubber or other soft material is provided in the socket member 11, and a metal plate 15 of dished form snugly fits the liner 14 and the ball 10. The metal of the ball 10 will preferably be of different hardness than the member 15 so as to give better friction. The liner disc 14, of course, gives a desired yieldability in the joint.

A stud 16 having a notched head for a screw driver is journaled in the base 8, and at its inner end, has a pinion 17 rigidly secured thereto and meshing with the gear wheel 13, so that when the stud 16 is turned by a screw driver, the threaded plug 11 will be rotated to change the tension and frictional force on the ball 10.

The ball 10 has formed integrally therewith an extension that is bifurcated and widened to form clip elements 18 and 19. The outermost ends of the elements 18 and 19 have inturned lips 20 and 21 respectively formed thereon to extend beneath the edges of a metal channel 22. A screw 23 serves to hold the elements 18—19 in gripping engagement with the channel 22, the lips 20—21 affording positive vertical support for the frame 22.

The channel frame 22 is of inverted U-form and receives the upper edge portion of a glare screen plate 25 which may be made of a single sheet of tinted plate glass, or may be of laminated form wherein the adhesive film between two sheets of glass is tinted to the desired shade. The plate 25 will be held in the frame 22 by suitable adhesive material. The lips 20—21 are preferably made of such length that they will not actually engage the glass when the screw 23 is tightened.

When more positive connection is required between the frame 22 and the glass than that afforded by the glue, the glass will have notches 27 ground therein, to receive studs or screws 28 that extend through the channel frame and positively hold the glass in place.

The legs of the frame 22 are made of short vertical length relative to the plate 25 so that they will not interfere seriously with sidewise vision of the driver, but they are still of sufficient length to adequately support the glass against strains imposed thereon when the driver grasps the lower edge of the plate to swing it to various angular positions. In order to permit the glass to be swung upwardly to approximately the roof of the car, notwithstanding the fact that the frame members 7 and the joint are mounted in an inclined plane, a notch 26 is provided in the socket 12 to receive the shank of the extension 18—19 when the plate 25 is moved to its uppermost position.

I claim as my invention:

1. A glare screen comprising a frame for supporting a plate, a ball element carried by the frame, a socket member having a seat that partly encloses the outermost surface of the ball, the rearmost portion of the member being attachable to a support, a second socket member in the rear part of the other socket member, and engageable with the rearmost surface of the ball, a threaded connection between the two socket members, a pinion journaled in the base of the first-named socket member, and a gear wheel secured to the second socket member and meshing with the pinion, whereby through turning of the pinion the socket members will be relatively adjusted to vary their frictional holding force on the ball.

2. An adjustable mounting for a supporting member, comprising a ball element secured at its outer side to said member, a socket member having a seat that partly encloses the outermost surface of the ball, the rearmost portion of the socket member having a base attachable to a support, a second socket member in the rear part of the first-named socket member and engageable with the rearmost surface of the ball, a threaded connection between the two socket members, a pinion journaled in the base of the first-named socket member, and a gear wheel secured to the second-named socket member and meshing with the pinion, whereby through turning of the pinion the socket members will be relatively adjusted to vary their frictional holding force on the ball.

LEE ALEXANDER BELL.

REFERENCES CITED

The following references are of record in the file of this patent:

UNITED STATES PATENTS

| Number | Name | Date |
|---|---|---|
| 357,337 | Rosenblatt | Feb. 8, 1887 |
| 394,680 | Dawes | Dec. 18, 1888 |
| 1,491,399 | Hein | Apr. 22, 1924 |
| 1,776,496 | Eiland | Sept. 23, 1930 |
| 1,868,031 | Sudbrink | July 19, 1932 |
| 1,913,277 | Hoople | June 6, 1933 |
| 2,037,303 | Battee | Apr. 14, 1936 |
| 2,236,710 | Hocking | Apr. 1, 1941 |